United States Patent
Moore

(10) Patent No.: US 7,116,869 B2
(45) Date of Patent: Oct. 3, 2006

(54) METHOD AND APPARATUS FOR MONITORING FIBER OPTIC COMMUNICATIONS

(75) Inventor: Brian Moore, Edmonton (CA)

(73) Assignee: Bigbangwidth Inc., Edmonton (CA)

( * ) Notice: Subject to any disclaimer, the term of this patent is extended or adjusted under 35 U.S.C. 154(b) by 734 days.

(21) Appl. No.: 10/132,758

(22) Filed: Apr. 25, 2002

(65) Prior Publication Data
US 2004/0208435 A1   Oct. 21, 2004

(30) Foreign Application Priority Data
Dec. 5, 2001   (CA) .................................... 2364402

(51) Int. Cl.
*G02B 6/35* (2006.01)
*G02B 6/42* (2006.01)

(52) U.S. Cl. ......................... 385/48; 385/16; 385/140

(58) Field of Classification Search ............ 385/16–24, 385/140, 48
See application file for complete search history.

(56) References Cited

U.S. PATENT DOCUMENTS

| | | | |
|---|---|---|---|
| 5,377,288 A | 12/1994 | Kashyap et al. ............... | 385/37 |
| 5,510,917 A | 4/1996 | Corke et al. ................ | 359/110 |
| 5,712,942 A | 1/1998 | Jennings et al. ............ | 385/134 |
| 5,832,156 A | 11/1998 | Strasser et al. ............... | 385/48 |
| 5,900,983 A * | 5/1999 | Ford et al. ................... | 359/627 |
| 6,041,069 A | 3/2000 | Kashyap et al. ............... | 372/6 |
| 6,157,443 A | 12/2000 | Jennings et al. ........... | 356/73.1 |
| 6,233,263 B1 | 5/2001 | Chang-Hasnain et al. .... | 372/32 |
| 6,246,826 B1 * | 6/2001 | O'Keefe et al. ............ | 385/140 |
| 2003/0031451 A1* | 2/2003 | Hong et al. ................. | 385/140 |

OTHER PUBLICATIONS

*Monitoring Fiber Networks*, Stephen G. Bavington, published in the 2nd quarter, 2001 issue of Spirent.com e-magazine published by Spirent Communications.

* cited by examiner

*Primary Examiner*—Michelle Connelly-Cushwa
(74) *Attorney, Agent, or Firm*—Davis & Bujold, P.L.L.C.

(57) ABSTRACT

A method and apparatus for monitoring fiber optic communications involves providing a space between a first end of a first optical fiber and a second end of a second optical fiber. A reflector is movable between a retracted position and an active position. In the active position, the reflector is positioned in the path of an optical signal beam passing through the space between the first optical fiber and the second optical fiber to reflect a portion of the optical signal beam as a tap signal. The reflector is selectively moved between the retracted position and the active position. This enables the tap signal to be selectively turned off and on. It also enables the portion of the optical signal beam reflected to be selectively adjusted.

3 Claims, 10 Drawing Sheets

METHOD AND APPARATUS FOR MONITORING FIBER OPTIC COMMUNICATIONS

FIELD OF THE INVENTION

The invention relates to a method and apparatus for monitoring fiber optic communications for such performance parameters as power of an optical signal, wavelength of the signal, strength of the signal, and, where necessary, to capture encoded data from the optical signal.

BACKGROUND OF THE INVENTION

The performance of a fiber optic communication system is dependent on the strength of a signal that can be transmitted along a length of optical fiber in an optical communication channel and retention of the quality of the signal during transmission. A signal that has lost a portion of its strength during transmission along one length of optical fiber must be boosted to recover that strength before transmission along further successive lengths of optical fiber, or else the signal will be too weak to be detected and understood after transmission along several lengths of optical fiber. Similarly, the quality of the signal must be retained if it is to be clearly detected and understood after it has been transmitted along several lengths of optical fiber. Consequently, there is a need to monitor both the power and the quality of data transmitted as light signals along optical communication channels.

The number of optical fibers for communications has increased substantially in recent years, with the consequence that the costs for installation and operation of optical fiber systems have dropped to values comparable with those for coaxial cable systems. Thus there is a need for improved capability to monitor optical fiber systems.

Stephen G. Bavington has described the current state of the art optical fiber monitoring technologies in "*Monitoring Fiber Networks*", published in the $2_{nd}$ quarter, 2001 issue of Spirent.com e-magazine published by Spirent Communications. This article describes a system in which the apparatus for monitoring fiber optic communications includes single fixed optical taps on each fiber communications channel among an array of fiber communications channels. Each tap is in optical communication with a matrix of optical switches, which in turn is connected to selected signal analysers. In this system, each tap is a fixed fiber optical signal splitter with a fixed tap ratio.

Typically, electro-optic technology is used in systems for monitoring optical fiber communications. An optical signal being transmitted along an optical channel is intercepted and converted to an electrical signal for retiming and data recovery. The power and quality of the signal is assessed, and the performance of the optical fiber is thereby evaluated. This method of monitoring data communications is expensive. The cost of termination of fibers also is expensive. Thus the cost of monitoring the performance of optical fiber communication systems is increasing as the number of optical channels increases. Frequency and wavelength multiplexing allows each fiber to carry several signals simultaneously, thus further increasing the complexity and cost of monitoring optical fiber communications. Considerable effort is being made to enable monitoring of optical transmission of data, and methods of tapping said optical transmissions, as described in the following examples.

Chang-Hasnain et al. in U.S. Pat. No. 6,233,263, issued in 2001, describe a monitoring and control assembly for a wavelength stabilized optical system. The assembly includes a tunable laser and an adjustable wavelength selective filter whereby the signal is split selectively by wavelength of the signal into a reflected portion and a transmitted portion of said signal. At least one photodetector is used to monitor a beam of light as a function of wavelength of light emitted by the laser and the position of the wavelength selective filter.

Strasser and Wagener in U.S. Pat. No. 5,832,156, issued in 1998, describe a dispersive optical waveguide tap comprising a refractive index grating, coupling means and utilization means. Optical co-operation between the waveguide and the coupling means changes the guiding conditions, thereby directing the guided mode light into one or more radiation modes instead of transmission mode.

Jennings et al. in U.S. Pat. No. 5,712,942, issued in 1998, describe an optical communications system having distributed intelligence. Distributed intelligence interconnection modules optically connect one optical channel to another optical channel. The modules allow monitoring, testing and/or related activities of the overall optical communications system to be performed locally at the interconnection modules in an automatic and continuous manner. The interconnections each have actively intelligent microcontrollers thereon. A signal is tapped using an optical tap. The type of optical tap is not specified.

Corke et al. in U.S. Pat. No. 5,510,917, issued in 1996, describe optical communication monitoring and control. A fraction of signals being transmitted along an optical communications channel, at different signal carrier wavelengths, is tapped using an optical tap. A set of communication signals is transmitted using at least two distinct carrier optical wavelengths. The signals are demultiplexed and compared to a standard. Thereby the performance quality of the optical pathway is evaluated.

All of the above described methods and apparatus use fixed fiber optical signal splitters having fixed tap ratios that are capable of capturing a fraction of the optical signal. The fraction of the signal required varies with the monitoring function, for example: monitoring the power of a signal 1%, monitoring wavelength of a signal 3%, monitoring the quality of the signal 5%, and capturing encoded data from optical signal 10%. Of course, these are estimated values that vary depending with proximity of the monitoring apparatus to the transmission source or a transmission booster. It is not desirable to divert 10% of the signal to the monitoring apparatus if 1% will do, as the signal is weakened by whatever fraction of the signal is diverted to the monitoring apparatus. At the present time monitoring apparatus are, therefore, selected based upon specific monitoring requirements.

SUMMARY OF THE INVENTION

What is required is an alternative method and apparatus for monitoring fiber optic communications.

According to one aspect of the present invention there is provided a method for monitoring fiber optic communications which involves providing a space between a first end of a first optical fiber and a second end of a second optical fiber. A reflector is movable between a retracted position and an active position. In the active position, the reflector is positioned in the path of an optical signal beam passing through the space between the first optical fiber and the second optical fiber to reflect a portion of the optical signal beam as a tap signal. The reflector is selectively movable between the retracted position and the active position.

According to another aspect of the present invention there is provided an apparatus for monitoring fiber optic communications which a body providing an optical channel which is adapted for positioning in a space between a first end of a first optical fiber and a second end of a second optical fiber. In order for an optical signal beam to pass between the first optical fiber and the second optical fiber the optical signal beam must pass through the optical channel. An optical tap communicates with the optical channel. The optical tap includes a reflector movable relative to the optical channel between a retracted position and an active position. In the retracted position, the reflector is spaced from the optical channel. In the active position the reflector is positioned in the path of the optical signal beam passing through the optical channel thereby reflecting a portion of the optical signal beam as a tap signal. Means is provided for moving the reflector between the retracted position and the active position.

Preferably the apparatus is manufactured by a process comprising a combination of micromachining and/or etching the shape of the movable portions and the base from a monolithic wafer. Manufacturing the apparatus from a monolithic wafer conveys several advantages, especially for the manufacture of the very small optical path taps required for the method of monitoring fiber communications according to the present invention. One advantage is that all the components are manufactured so that they are very accurately situated relative to each other. Thus there is no need to assemble the movable portions and the base to construct the apparatus. Another advantage is that several of the apparatus can be made from a single monolithic wafer. Yet another advantage is that an array of copies of the apparatus, and when necessary other apparatus, can be manufactured simultaneously from a single wafer. More preferably the apparatus is manufactured by micromachining and/or etching a monolithic wafer comprising a first layer that is silicon, a second layer that is silicon dioxide and a third layer that is again silicon. When the movable portion is a portion of the first layer and the base includes the third layer, the portion of the second layer that is situated between the movable portion and the base can be removed by etching the silicon dioxide, thereby allowing the movable portion to move relative to the base.

By following the teachings of the method or utilizing the basic apparatus, described above, one can selectively turn an optical tap on and off. The ability to turn the optical tap on and off is, in and of itself, an advance in the art. However, there will hereinafter be further described additional features that further improve the utility of the invention.

Although beneficial results may be obtained through the use of the apparatus, as described above, different percentages of the optical signal beam must be sampled depending upon the objective of the monitoring. Even more beneficial results may be obtained when the reflector has a range of active positions. This enables the portion of the optical signal beam taken as a tap signal to be selectively adjusted by altering the active position of the reflector. The portion of the optical signal beam reflected should be-limited in order to ensure that the optical tap remains unobtrusive. It is preferred that the portion of the optical signal beam reflected not exceed approximately 10% of the strength of the optical signal beam. The portion of the optical signal beam that is reflected can be limited by limiting the extent to which the optical tap can be positioned within the path of the optical signal beam, for example by means of a stop.

Although beneficial results may be obtained through the use of the apparatus, as described above, whenever an optical signal beam exists an optical fiber it tends to diffuse. Even more beneficial results may, therefore be obtained when a pair of collimators are situated within the optical channel for collimating the optical signal beam as it passes between the first end of the first optical fiber and the second end of the second optical fiber. When a pair of collimators are used, the reflector in the active position is preferably situated between the pair of collimators.

Although beneficial results may be obtained through the use of the apparatus, as described above, the preferred means for moving the reflector between the retracted position and the active position is an electrical actuator. Beneficial results have been obtained when the electric actuator includes a first comb which is intermeshed with a second comb. This form of electric actuator enables the positioning of the reflector to be selectively adjustable when in the active position. The first comb and the second comb repel each other when their polarity is the same and attract each other when their polarity is opposite. The degree to which they attract or repel each other depends upon the amount of electric potential applied.

Although beneficial results may be obtained through the use of the apparatus, as described above, there are "off peak" hours during which there are less demands upon the optical fiber network. Even more beneficial results may be obtained when means is provided to periodically sample the optical signal beam on a timed basis to minimize disruption. An example of said means is a programmable controller, by which both the time and duration of use of the apparatus to tap an optical signal, and the amount of the optical signal that is tapped, are controllable.

Although beneficial results may be obtained through the use of the apparatus, as described above, a certain portion of the optical signal beam can be lost through inefficient reflection. Even more beneficial results may, therefore, be obtained when the reflector has a highly reflective nano-reflective surface.

Although beneficial results may be obtained through the use of the apparatus, as described above, eventually the tap signal must be analyzed. This means a detector is required. Although this detector can be independent from the apparatus, it is more efficient if the detector is part of the apparatus. Even more beneficial results may, therefore, be obtained when the optical tap includes a detector. This detector can either have means to analyze the tap signal or means to communicate with an analyzer that analyzes the tap signal.

Although beneficial results may be obtained through the use of the apparatus, as described above, optical signal beams travel in both directions along fiber optic networks. Even more beneficial results may, therefore, be obtained when a pair of optical taps are provided. One of said pair of optical taps is oriented so as to tap the optical signal beam as it passes along the optical channel in a first direction. The other of said pair of optical path taps being oriented so as to tap the optical signal beam as it passes in a second direction along the optical channel. The pair of optical path taps operate independently of each other.

Although beneficial results may be obtained through the use of the apparatus, as described above, most fiber optic networks consist of bundles of fibers. Even more beneficial results may, therefore, be obtained when a plurality of optical path taps are used to monitor signals being transmitted in an array of a plurality of optical channels, each of said optical path taps having reflectors which are independently movable between the retracted position and the active position to monitor signals being transmitted in a selected direction along a selected one of the plurality of optical channel of the array.

DETAILED DESCRIPTION OF THE INVENTION

An apparatus 10 and a method for monitoring fiber optic communications in a controllable manner will be described with reference to FIGS. 1 through 8.

Figure 1:
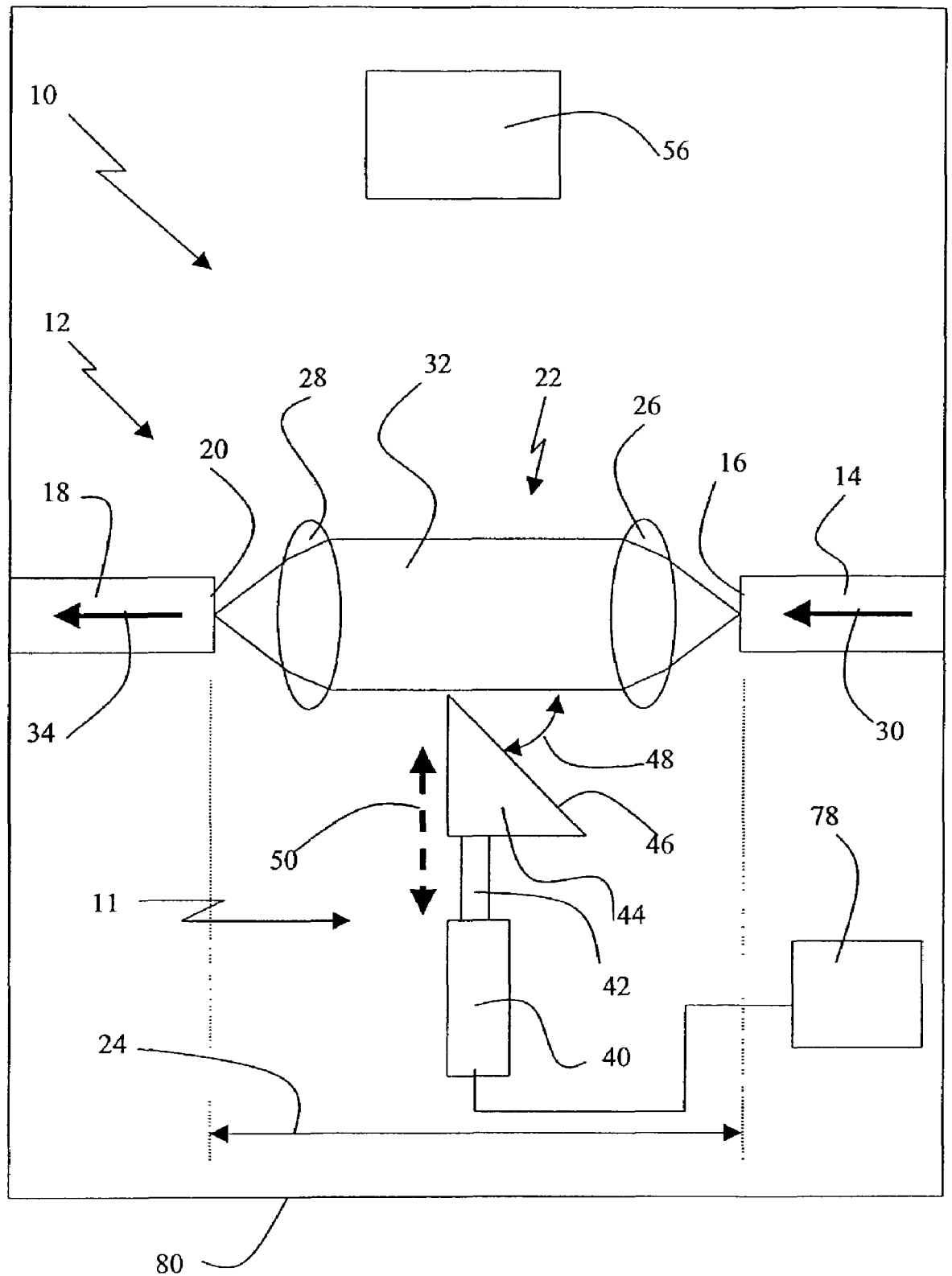
FIG. 1 is a schematic plan view of an optical signal monitor for monitoring a signal in a fiber optic channel having the actuator and optical path tap in the off position.
Figure 2:
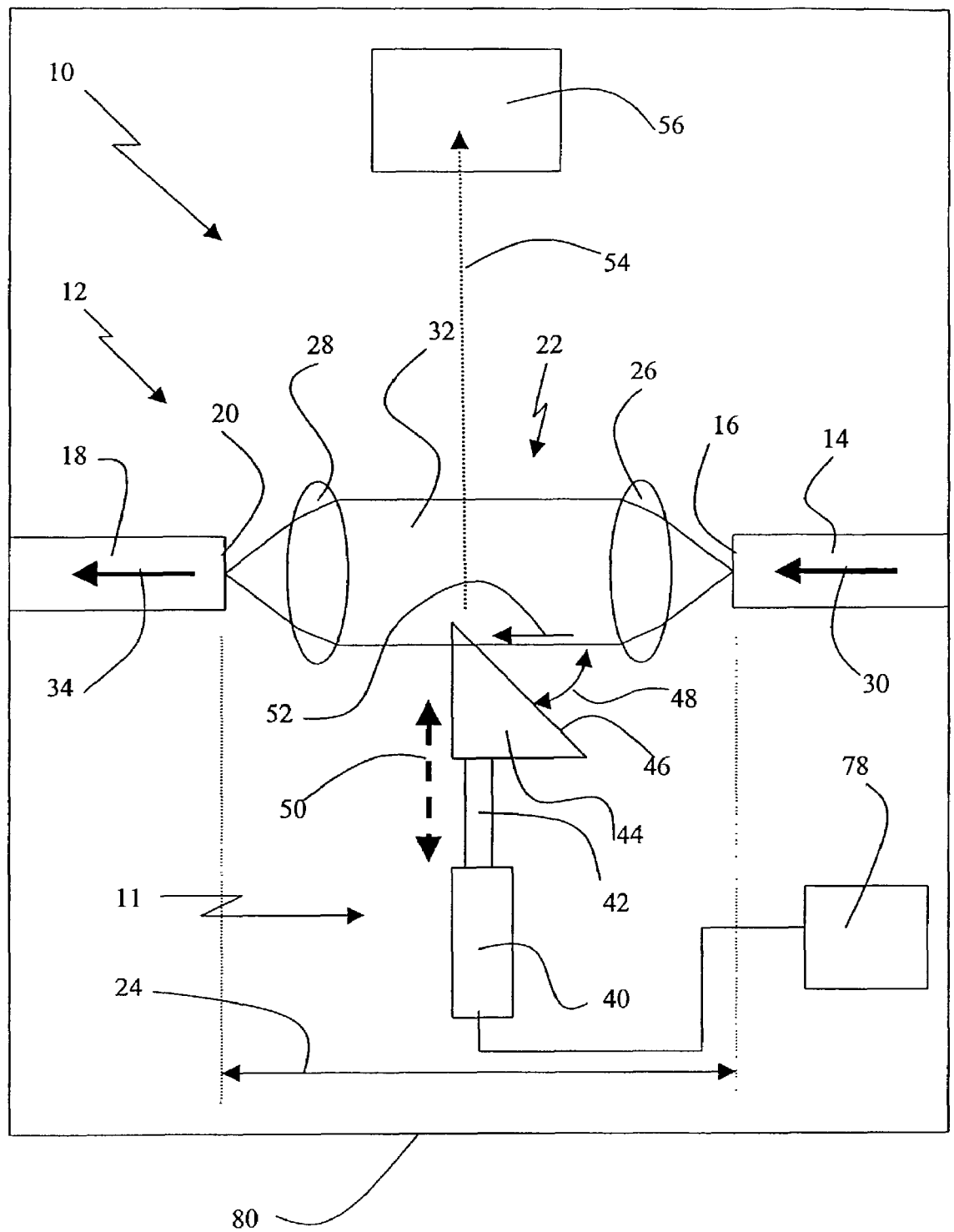
FIG. 2 is a schematic plan view of the optical signal monitor as shown in FIG. 1, in which the actuator and the optical path tap are in the on position.

Referring to FIGS. 1 and 2, apparatus 10 has a body 80 providing at least one optical path tap 11 for sampling an incoming light signal 30 along an optical channel 12. Optical channel 12 includes a first optical fiber 14 having a first end 16, a second optical fiber 18 having a second end 20, and a free space path 22 situated between first end 16 and second end 20. A length of free space path 22 is indicated by double arrow 24. A first collimator 26 and a second collimator 28 are situated in free space path 22. Incoming light signal 30 is emitted from first end 16 of first fiber 14 and is collimated by first collimator 26 as a beam 32 toward second collimator 28. Beam 32 is collimated by second collimator 28 toward second end 20 of second fiber 18 and is transmitted along second fiber 18 as a transmitted signal 34. Similarly, a signal passing in the opposite direction to incoming signal 30 along optical channel 12 is emitted from second end 20 and is collimated by second collimator 28 and first collimator 26 toward first end 16 and then along first fiber 14 (not illustrated in FIGS. 1 and 2). Length 24 of free space path 22 is very short so as to maximize a high optical efficiency of free space path 22 from first fiber 14 to second fiber 18.

Figure 3:
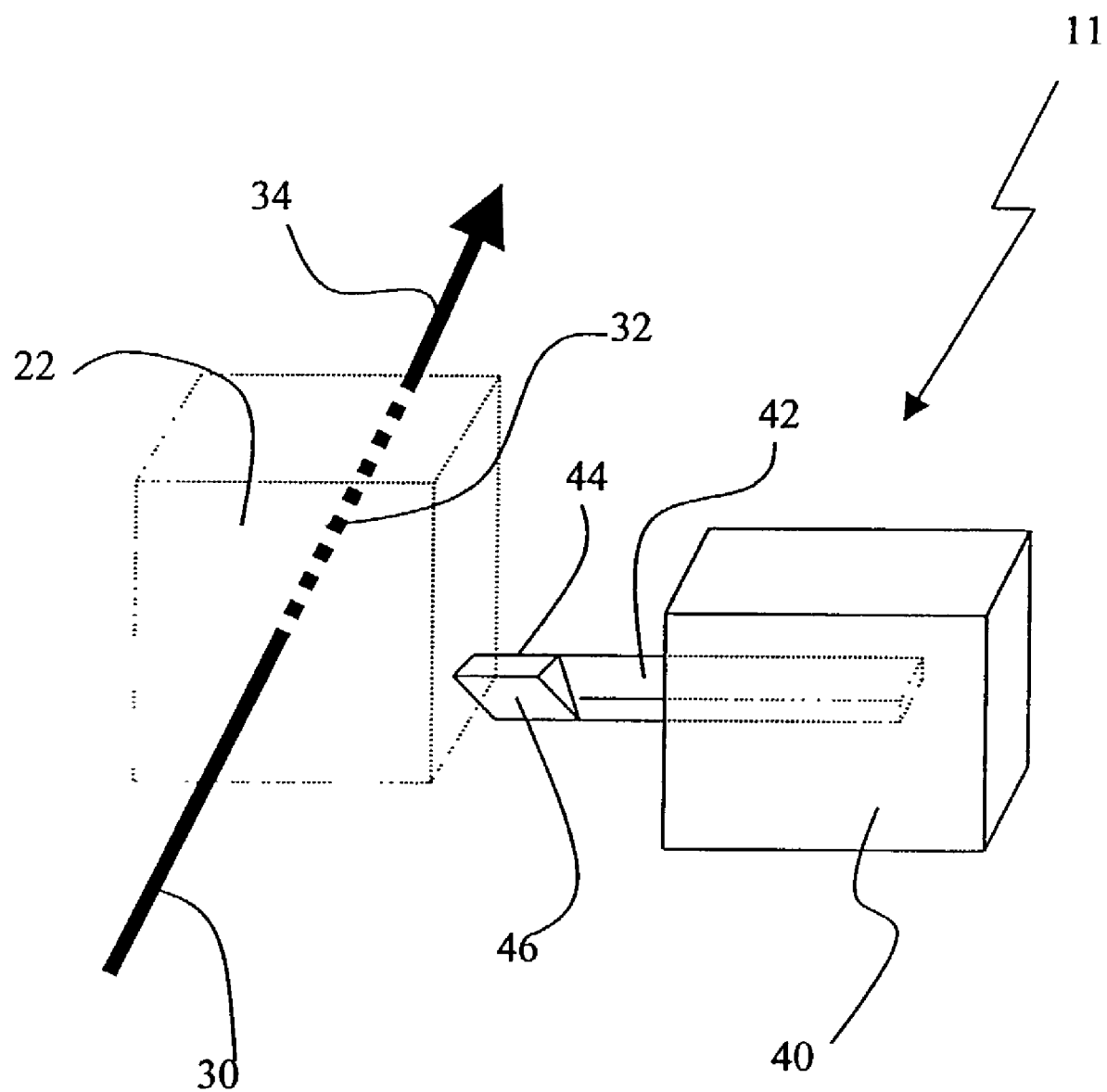
FIG. 3 is a perspective diagram of the optical path tap in the off position, as illustrated in FIG. 1.
Figure 4:
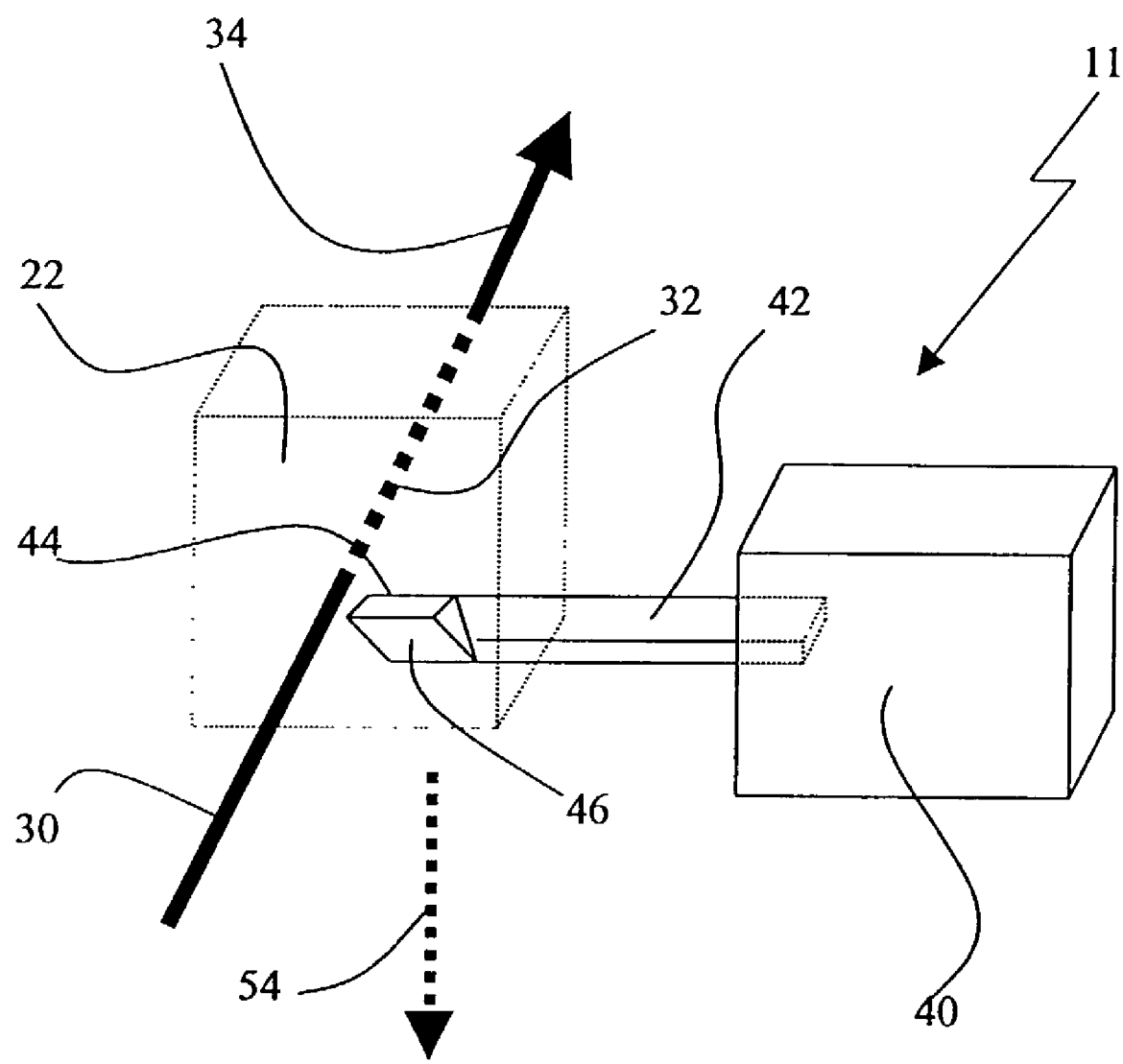
FIG. 4 is a perspective diagram of the optical path tap in the on position, as illustrated in FIG. 2.

Referring to FIGS. 3 and 4, apparatus 10 includes at least one optical path tap 11 comprising an electrical drive system 40, an actuator 42 and a reflector 44. Reflector 44 has a nano-reflective surface 46. Referring again to FIG. 1, surface 46 is inclined at an angle 48 to beam 32, angle 48 being less than a right angle and preferably being an angle of approximately 45 degrees. Drive system 40 activates actuator 42 so as to move reflector 44 as indicated by dashed double arrow 50 between a retracted position, illustrated in FIGS. 1 and 3, and an extended position, illustrated in FIGS. 2 and 4.

Figure 8:
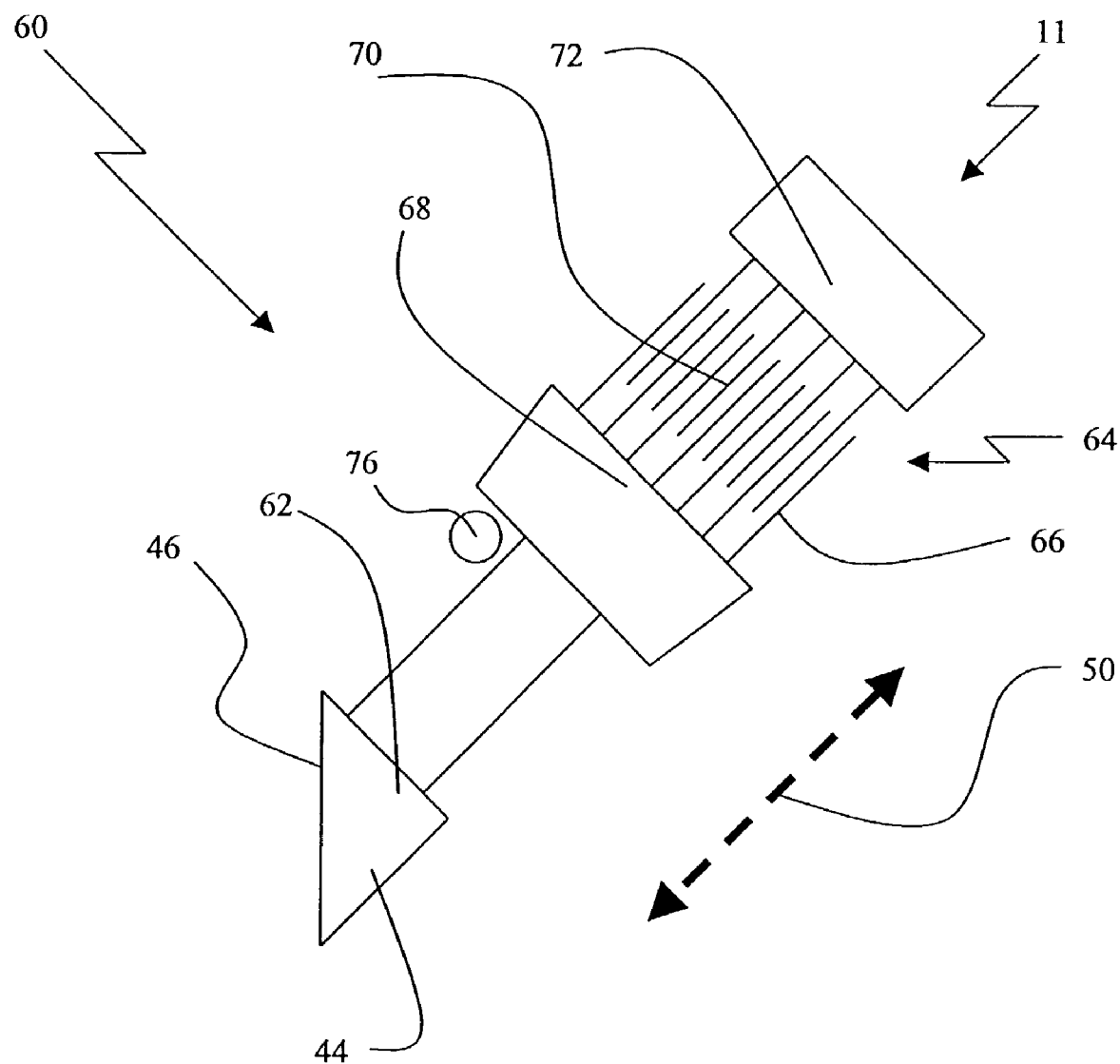
FIG. 8 is a plan view of a preferred embodiment of the optical path tap shown in FIG. 2, in which the nano-reflective surface is a face of a nano-machined plate.

Referring to FIG. 8, a preferred embodiment of optical path tap 11 includes a nano-machined plate 60. A first portion 62 of plate 60 includes reflector 44. Nano-reflective surface 46 is one face of first portion 62. Electrical drive system 40 and actuator 42 are shown as a comb drive system 64 as an option. Comb drive system 64 has a first comb 66 that is a second portion 68 of plate 60 and a matching second comb 70 that is a fixed-in-place third portion 72 of plate 60. First portion 62 and second portion 68 of plate 60 are together movable relative to third portion 72 between an extended position and a retracted position, as indicated by dashed double arrow 50. First comb 66 and second comb 68 repel each other when they have the same electrical polarity, thereby reversibly extending reflector 44 to the on position, as shown in FIGS. 2 and 4. First comb 66 and second comb 68 are attracted to each other when they have opposed electrical polarities, thereby reversibly retracting reflector 44 to the retracted position or off, as shown in FIGS. 1 and 3.

Figure 9:
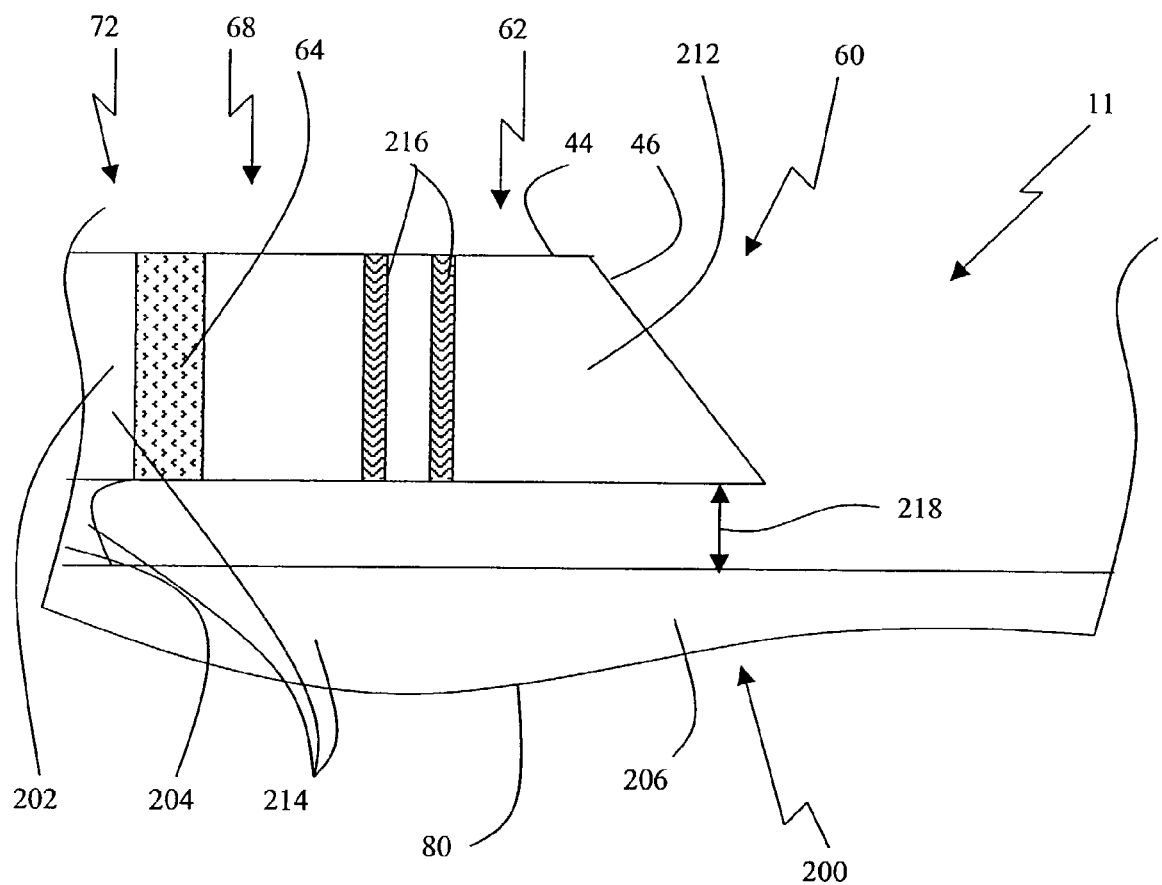
FIG. 9 is a side elevation view, not to scale, of the optical signal monitor as shown in FIG. 1, which is manufactured by micromachining and etching a monolithic wafer comprising a first layer that is silicon, a second layer that is silicon dioxide and a third layer that is again silicon.
Figure 10:
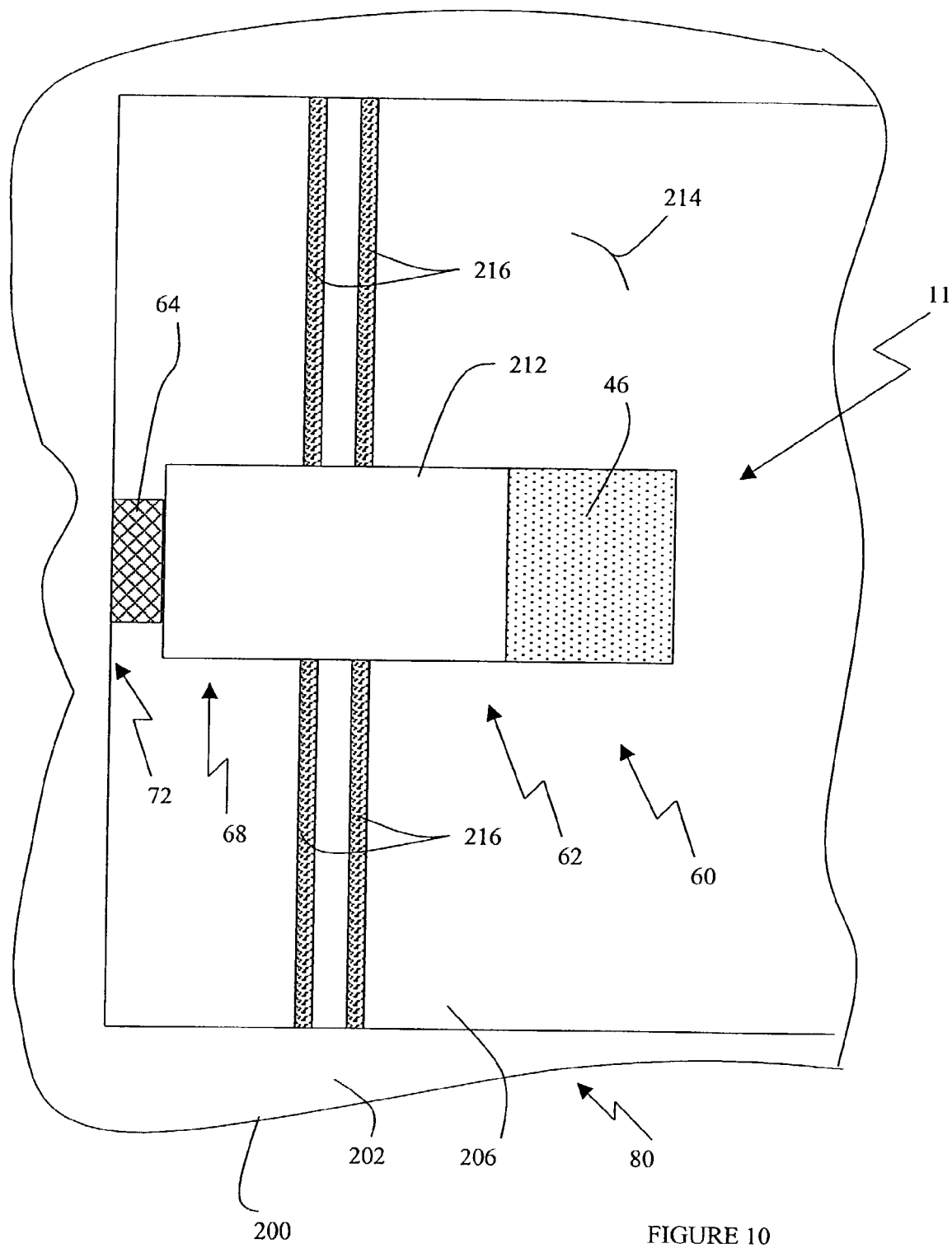
FIG. 10 is a top plan view, not to scale, of the optical signal monitor manufactured from a monolithic wafer as shown in FIG. 9.

Referring to FIGS. 9 and 10, preferably, body 80 is fabricated by using a combination of micromachining and/or etching of a monolithic wafer 200. Even more preferably, wafer 200 comprises a first layer 202 that is silicon, a second layer 204 that is silicon dioxide, and a third layer 206 that is again silicon, It is known that devices including at least one movable part and a base can be microfabricated using a combination of micromachining and etching of a wafer of this type. Each of plurality of optical path taps 11 includes a movable part 212 and a base 214. Movable part 212 is maintained at a height 218 above base 214 by a plurality of supporting members 216. It has been found that four supporting members, two of which are situated at each side of movable part 212, are sufficient to maintain movable member 212 at height 218 above base 214, as illustrated in FIG. 9. Referring to FIG. 10, movable part 212 moves relative to base 214 in response to a moving force applied by an actuator, such as comb drive 64. An amount and direction of movement of movable part 212 relative to base 214 is determined by an amount and direction of the moving force applied by comb drive 64. When movable part 212 is moved, supporting members 216 are reversibly deformed and apply a resisting force on movable part 212. The resisting force increases with increasing deformation of supporting members 216, and therefore increases with increase in the moving force applied to movable part 212. When the moving force is removed, the resisting force causes movable part 212 to return to a resting position. Normally, when movable part 212 is in the resting position, reflective surface 46 is situated outside beam 32, as illustrated in FIG. 1.

Referring to FIGS. 1 and 3, when reflector 44 is in the retracted position, surface 46 is situated entirely outside beam 32. Referring to FIG. 2, when reflector 44 is in the extended position, surface 46 intercepts a small portion of beam 32, indicated by arrow 52. Portion of beam 52 is reflected as a tap signal, indicated by dotted arrow 54, toward a detector 56 for analysis.

Figure 6:
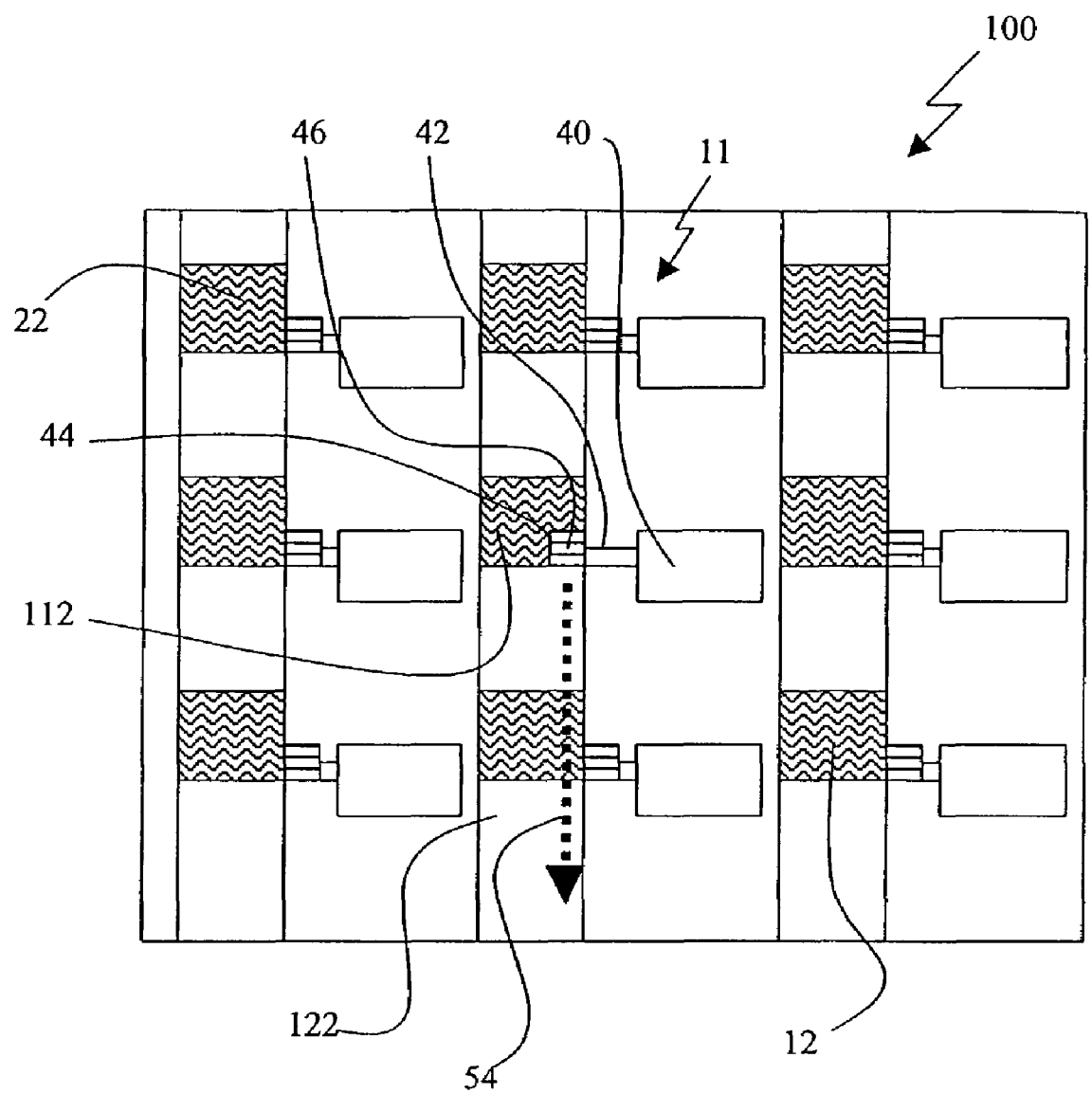
FIG. 6 is an end view of a three dimensional array of optical channels, in which the optical signals along one selected channel are being monitored by the optical signal tap shown in FIG. 2.

Referring to FIG. 6, a plurality of optical path taps 11 is used to monitor signals in an array 100 of a matching plurality of optical channels 12. A selected optical channel 112 among array 100 is shown as being monitored in FIG.

6. Tap signal 54 is reflected by nano-reflective surface 46 along tap signal path 122 toward detector 56, illustrated in FIG. 2.

Figure 5:
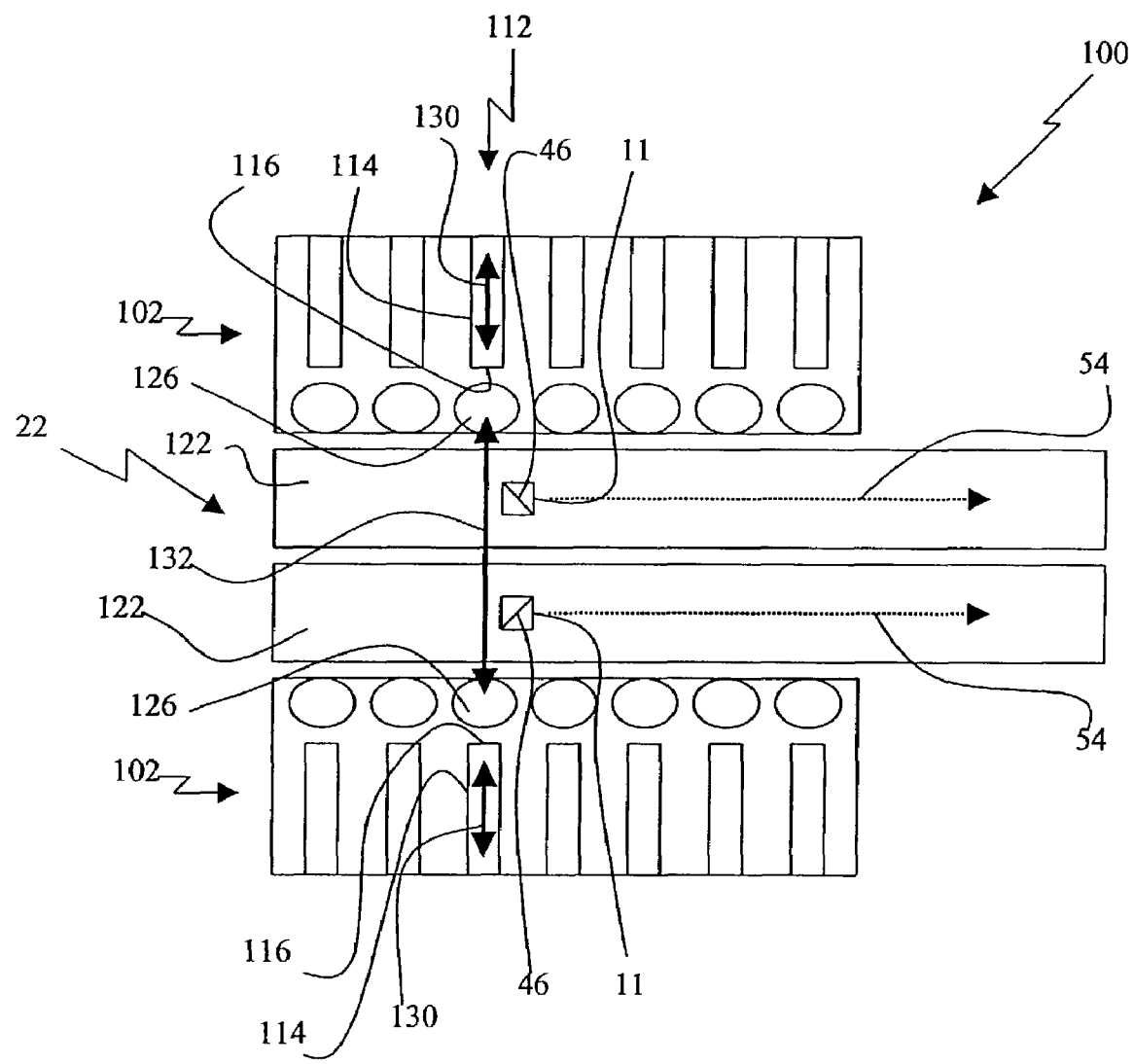
FIG. 5 is a schematic side view of an array of optical channels showing monitoring of signals in both directions along a selected one of the optical channels using a pair of the optical path taps shown in FIG. 2.

Referring to FIG. 5, a pair of optical path taps 11 is used to simultaneously monitor signals in each direction, as indicated by double arrows 130, in selected optical channel 112 among an array of optical channels 100. Array of optical channels 100 includes two mutually aligned input/output arrays 102 comprising matching pluralities of fibers 114 and collimators 126. Selected optical channel 112 includes a pair of fibers 114 and a pair of collimators 126. Signals 130 are collimated by pair of collimators 126 in each direction as a beam, indicated by double arrow 132, between ends 116 of fibers 114. Each of pair of optical path taps 11 is situated in one of a pair of paths 122 situated in free space path 22. Each of optical path taps 11 is shown in the on position in FIG. 5. Tap signals 54 are reflected from nano-reflective surfaces 46 of each of optical path taps 11, thereby simultaneously monitoring signals 130 in each direction along selected optical channel 112.

Figure 7:
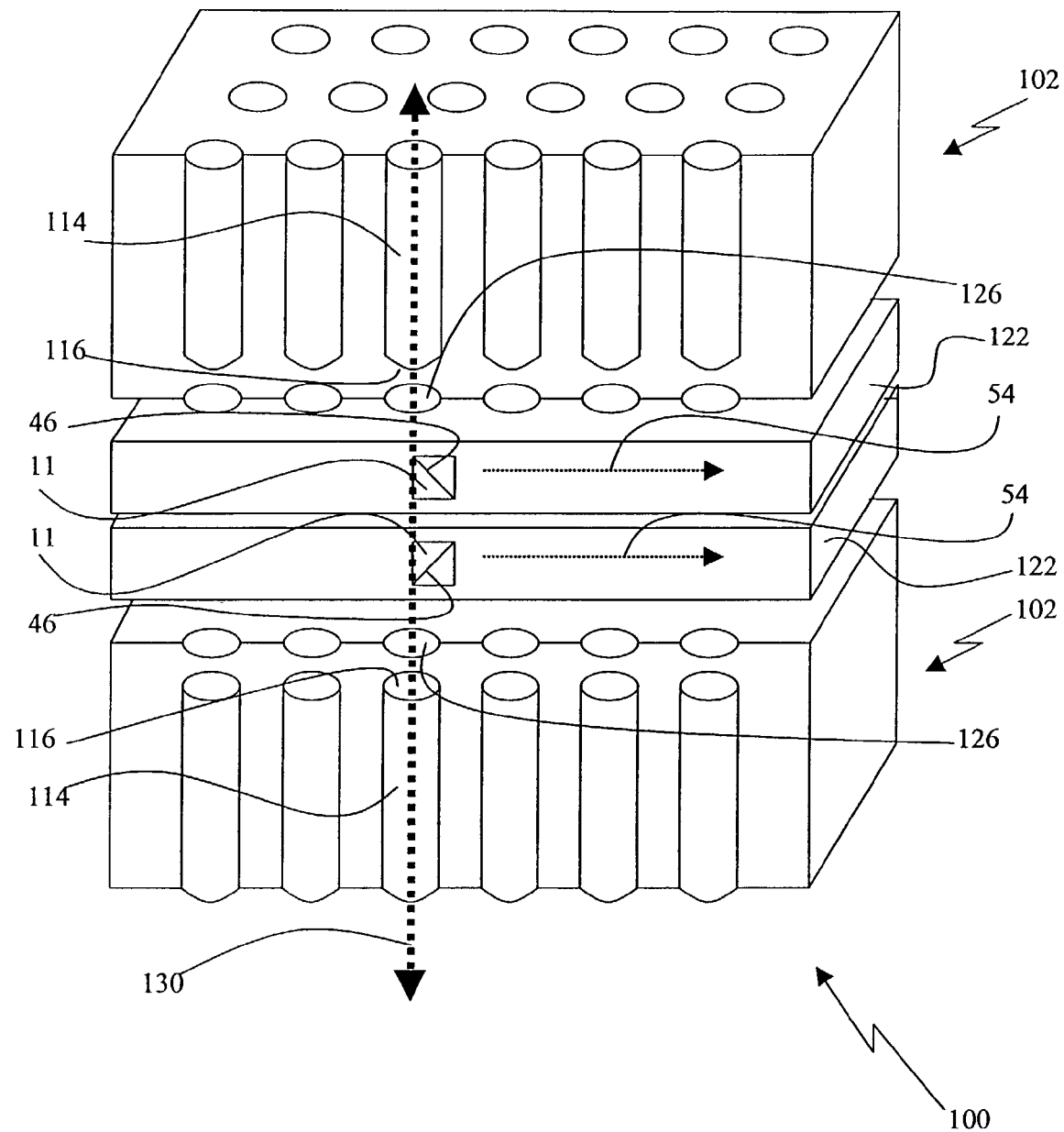
FIG. 7 is a perspective view of the three dimensional array of optical channels shown in FIG. 6.

Referring to FIG. 6, a plurality of pairs of optical path taps 11 is used for monitoring signals 130 in a matching plurality of optical channels 12 in a three-dimensional array of optical channels 100. Selected optical channel 112 is monitored independently of other optical channels 12. Referring to FIG. 7, selected optical channel 112 is monitored independently from other optical channels 12 in a three-dimensional array of optical channels 100. Pair of optical path taps 11 for monitoring selected optical channel 112 can be extended and retracted individually or concertedly to monitor signals 130 in either one or both of the directions along selected optical channel 112.

A power of incoming light signal 30 is measured by measuring a power of tap signal 54. Nano-reflective surface 46 is a very efficient reflecting surface for light used for transmission along optical channels 12. A size of nano-reflective surface 46 and the on position of optical path tap 11 are each selected so that the power of tap signal 54 is a known fraction of the power of incoming light signal 30. For example, optical path tap 11 can reflect 1% of the power of incoming light signal 30 as transmitted as beam 32. Thus, the power of incoming light signal 30 can be calculated by measuring the power of tap signal 54 using detector 56.

Nano-reflective surface 46 reflects all frequencies of light in a range of frequencies used for transmission of data along optical channels 12. Therefore, tap signal 54 has a quality that is very similar to a quality of incoming light signal 30. Thus, the quality of incoming light signal 30 can be measured by measuring the quality of tap signal 54 using detector 56.

A preferred embodiment of the present invention includes nano-reflective surface 46. It will be recognized by one skilled in the art that there are other reflective surfaces that can be substituted for nano-reflective surface 46 without departing from the spirit of the present invention.

A preferred embodiment of the present invention includes electrical drive system 40. It will be recognized by one skilled in the art that other types of electrical drive system can be substituted for comb drive system 64 without departing from the spirit of the present invention.

Optical path tap 11 can vary the amount of the signal tapped by selectively positioning of the reflector. Tap signal 54 comprises between 0% and 10% of a strength of incoming light signal 30 depending upon the purpose of monitoring. It is preferred that the tap signal be maintained under 10% in order to make the optical path tap unobtrusive. Referring to FIG. 8, one example of a means by which the tap signal can be maintained under 10% is by use of a stop 76 to limit movement of second portion 68 of plate 60 and thereby limit movement of reflector 44.

More preferably, optical path tap 11 is programmable for application under a variety of different field conditions. Optical path tap 11 is programmed to statistically monitor optical channel 12 on a timed basis, thereby allowing a quality of performance of optical channel 12 to be monitored during predetermined periods. For example, optical path tap 11 can be programmed to monitor optical channel 12 during off-peak hours when traffic along optical channel 12 is low, and not during peak traffic hours. Alternatively, optical path tap 11 can be programmed to monitor optical channel under a selected range of use, and thereby monitor performance of optical channel 12 under different load conditions. Referring to FIGS. 1 and 2, optical path tap 11 can be controlled by use of a programmable controller 78. Programmable controller 78 allows selection of the time at which incoming light signal 30 is tapped, the duration of the time when incoming light signal 30 is tapped, and the amount by which incoming light signal 30 is tapped.

The invention claimed is:

1. An apparatus for monitoring fiber optic communications, comprising:
    a body providing an optical channel which is adapted for positioning in a space between a first end of a first optical fiber and a second end of a second optical fiber, such that in order for an optical signal beam to pass between the first optical fiber and the second optical fiber the optical signal beam must pass through the optical channel;
    a pair of optical taps, one of said pair of optical taps being oriented so as to tap the optical signal beam as it passes along the optical channel in a first direction and the other of said pair of optical taps being oriented so as to tap the optical signal beam as it passes in a second direction along the optical channel, the pair of optical taps operating independently of each other;
    each of the optical taps including:
        a reflector movable relative to the optical channel between a retracted position in which the reflector is spaced from the optical channel and an active position in which the reflector is positioned in the path of the optical signal beam passing through the optical channel thereby reflecting a portion of the optical signal beam as a tap signal; and
        means for moving the reflector between the retracted position and the active position.

2. The apparatus as defined in claim 1, in which a plurality of the pairs of optical path taps are used to monitor a selected number of a plurality of signals being transmitted in each direction in an array of a plurality of optical channels.

3. An apparatus for monitoring fiber optic communications, comprising:
    a body providing a plurality of optical channels each of which is adapted for positioning in a space between a first end of a first optical fiber and a second end of a second optical fiber, such that in order for an optical signal beam to pass between the first optical fiber and the second optical fiber the optical signal beam must pass through one of the plurality of optical channels;
    a pair of collimators situated within each of the plurality of optical channel for collimating the optical signal beam as it passes between the first end of the first optical fiber and the second end of the second optical fiber;

a pair of optical taps for the each of the plurality of optical channels, one of said pair of optical taps being orientated so as to tap the optical signal beam as it passes in a first direction and the other of said pair of optical path taps being oriented so as to tap the optical signal beam as it passes in a second direction, the pair of optical path taps operating independently of each other, each optical tap including:

a reflector movable relative to the optical channel between a retracted position in which the reflector is spaced from the optical channel and an active position in which the reflector is positioned between the pair of collimators in the path of the optical signal beam passing through the optical channel thereby reflecting a portion of the optical signal beam as a tap signal, the reflector having a range of active positions, such that the portion of the optical signal beam taken as a tap signal is selectively adjustable by altering the active position of the reflector; and means for moving the reflector between the retracted position and the active position.

* * * * *